Oct. 5, 1954

N. D. SCOTT 2,690,612

PLUG EXPANSION TOOL

Filed Dec. 6, 1947

Norman D. Scott   Inventor

By W. O. Hulman   Attorney

Oct. 5, 1954 N. D. SCOTT 2,690,612
PLUG EXPANSION TOOL
Filed Dec. 6, 1947 2 Sheets-Sheet 2

Norman D. Scott  Inventor
By W. O. Heilman  Attorney

Patented Oct. 5, 1954

2,690,612

UNITED STATES PATENT OFFICE 2,690,612

PLUG EXPANSION TOOL

Norman D. Scott, Sarnia, Ontario, Canada, assignor to Standard Oil Development Company, a corporation of Delaware Application December 6, 1947, Serial No. 790,144

1 Claim. (Cl. 29—213)

The present invention is concerned with a plug expansion tool which is particularly adapted for changing packing, flange gaskets, defective valves, or equivalent means on storage tanks, or other vessels under either positive pressure, or vacuum. The tool of the present invention comprises a pressure vacuum means which is adapted to be attached to the fitting to be serviced, tubular means disposed within said vacuum means which is adapted to be passed within the opening of the tank, and pull rod means disposed within said tubular means which is adapted to control an expanding plug to securely seal the vessel under pressure or vacuum.

In the manufacturing and chemical industries, particularly in the refining of petroleum oils, many of the final and intermediate products are stored under pressure, or under vacuum. In many instances due to length of service, or mechanical failures, it is necessary to service or replace packing gaskets, or valves connected with the storage tank. One method of doing this is to remove the liquid from the tank, or vessel. This is a rather expensive procedure, since it not only takes the tank or vessel out of service but requires an auxiliary storage tank, and entails the cost of pumping or transferring the liquid. It is an object of this invention to eliminate the time loss and expense inherent in the method of pumping out storage tanks when it becomes necessary to service or replace the attached fittings.

Another object of the invention is to provide a device which will effectively plug frost cracked nipples on storage tanks, or the like.

Another object of my invention is the providing of a safety saddle whereby the expansion tool may be forced into the nipple between the tank and the valve, against any pressure, and whereby the valve may be safely removed.

Other objects of this invention, and a fuller understanding thereof, will become apparent from the following description relating to the accompanying drawings showing an embodiment of my invention with respect to a gate valve, and in which.

Figure 1:
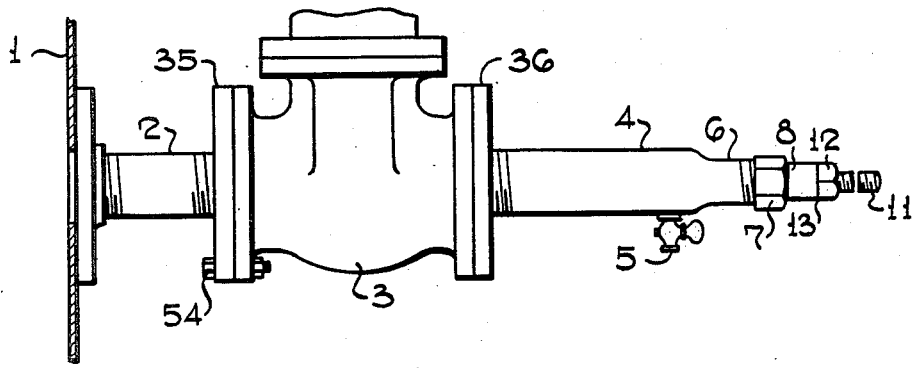
Fig. 1 is an elevation showing the device with the pressure vacuum chamber in position.
Figure 2:
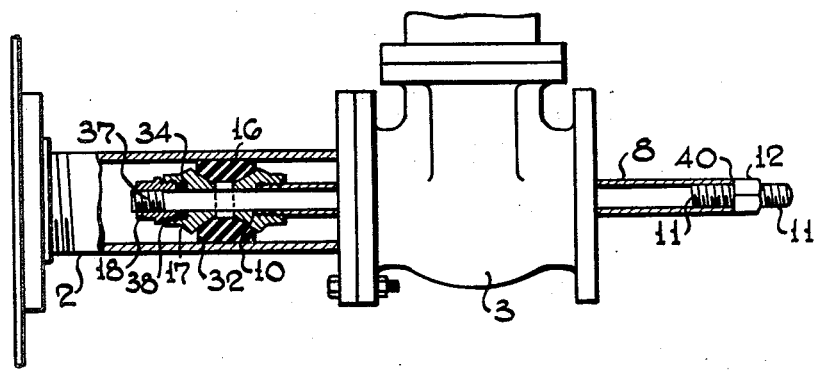
Fig. 2 is a vertical sectional view taken longitudinally through the apparatus of Fig. 1, drawn to a larger scale, showing the pull rod and expanding plug in position with the gate valve and the pressure chamber removed.

Referring specifically to Fig. 1, I designates a storage tank, or vessel, containing fluid under positive pressure, or vacuum. Welded to or threaded into the vessel I is a nipple 2 on which is threaded a flange 35. Bolted to this flange 35 by means of bolts 54, is a gate valve 3. Bolted to the other side of gate valve 3 is another flange 36, threaded to receive the pipe fittings ordinarily used in connection with the valve and the tank. In the practice of my invention, the gate valve 3 is closed, and the fittings removed from flange 36. A pressure vacuum chamber 4 is then threaded into flange 36. The pressure vacuum chamber terminates at the opposite end of the valve, preferably in a progressively reduced section 6, as shown, with packing nut 7 disposed in a threaded engagement with the end thereof. The packing nut 7 maintains a fluid seal between the pressure vacuum chamber 4, and a tubular member 8 which is positioned in a centrally disposed bore in the packing nut 7. Referring now to Figure 2, the tubular member 8 terminates in a bearing surface 40. The opposite end of the tubular member 8 terminates in threaded engagement with a cone shaped expanding member 10, having a sliding engagement with the pull rod 11. The expanding member may be threaded on the tubular member 8 as shown, or be constructed as an integral part of the tubular member. The pull rod 11, positioned within the tubular member 8, and in threaded engagement with nut 12, terminates at the opposite end in a cone shaped expanding member 17. The expanding member 17 is securely attached to the end of the pull rod 11 by means of nut 18 in threaded engagement with the end of the pull rod and locked by means of cotter pin 37. Alternatively the expanding member may be constructed as an integral part of the pull rod. A gland member 38, which is preferably made integral with the nut 18, is disposed in a threaded engagement within the bore 32 of expanding member 17. In the annular space of the bore 32 terminated by the packing gland 38 is a suitable packing material 34. An expansion plug 16 is interposed between the conical surface of the expanding members, and may be made of any elastic material such as natural rubber, or synthetic material. The choice of the particular material depends on the corrosive properties of the fluid contained in the storage tank. Bearing against the bearing surface 40, of the tubular member 8, is a threaded nut 12 which receives the threaded portion of the pull rod 11. By turning nut 12, the threaded engagement of said nut with pull rod 11, causes an axial movement of the pull rod within the tubular member 8. Rotation of the nut may be in such a direction as to cause compression of the elastic material 16, thereby causing the plug 16 to radially expand against the walls of the nipple, forming a fluid seal.

Figure 3:
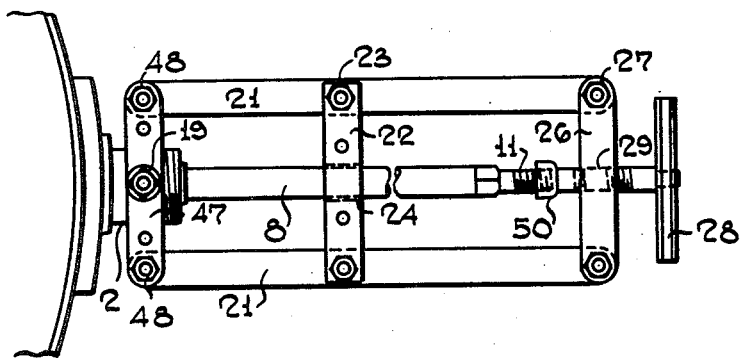
Fig. 3 is a plane view of the pull rod and expanding plug in operative position with the safety saddle attached, for the safe replacement of the valve.
Figure 4:
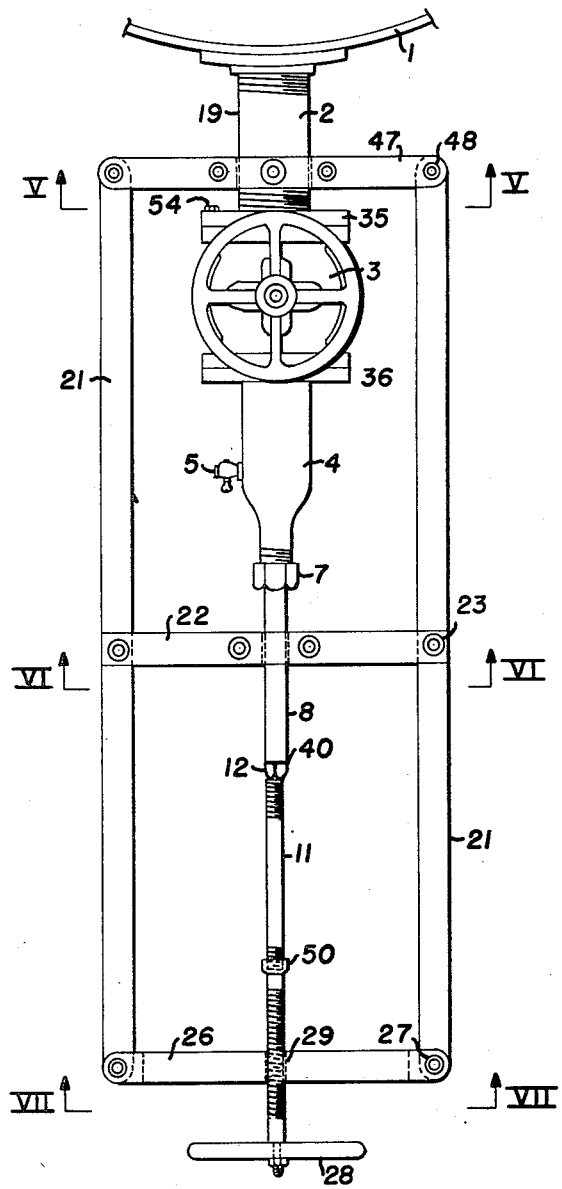
Fig. 4 is a top plan view showing the safety saddle construction.
Figure 5:
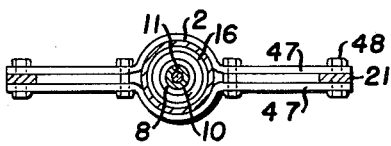
Fig. 5 is a transverse sectional view taken along the line V—V of Fig. 4.
Figure 6:
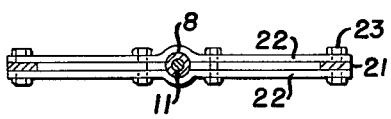
Fig. 6 is a transverse sectional view taken along the line VI—VI of Fig. 4.
Figure 7:
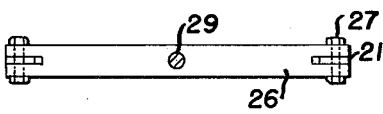
Fig. 7 is a transverse sectional view taken along the line VII—VII of Fig. 4.

In order to permit the changing of valves on a vessel under pressure, with absolute safety, a safety saddle as illustrated in Fig. 3, may be used. The saddle comprises a two section collar 47, encircling and rigidly clamping the saddle to the nipple by means of bolts 48, and set screw 19, which may be used in order to obtain the highest possible degree of safety. Extending longitudinally from the tank, and securely attached to each end of the collar 47 by means of bolts 48, are connecting links 21. Extending between the links 21, and attached by bolts 23 to the links, is a two section cross member 22, provided with a central passage 24, which encircles and clamps the tubular member 8. A cross member 26 is also connected to the ends of links 21, by means of bolts 27. The center section of the cross member 26 is threaded to accommodate a power screw 29, operated by means of hand wheel 28, and terminating in a thrust bearing 50, which bears against the end of the pull rod 11. The cross members 47 clamp the tank nipple 2 being held in place by bolts 48. The cross members 22 clamp tubular member 8 and are held in place by bolts 23. The cross member 26 is in one piece, the center section being threaded to accommodate power screw 29 operated by means of the hand wheel 28. The outer ends of member 26 have integrally formed yoke portions and connection is made to members 21 by means of bolts 27.

It is desirable to attach members 22, clamping lightly to member 8, before operating the mechanism. Such an attachment of members 22 gives better line support for tubular member 8, member 11 and for power screw 29 while the expanding plug is being put into play.

Thus, with the expanding plug in position, sealing the nipple and having drained the pressure chamber 4 of any liquid present, the gate valve 3 may be disconnected from flange 35 by removing bolts 54. Members 22 are then removed.

My device comprises essentially a pressure vacuum chamber which may be attached to a gate valve to be replaced, a tubular means passing through said pressure vacuum means, which is designed to also pass through the gate valve, a pull rod means having attached thereto an expanding plug assembly for operation in connection with the tubular means, and a safety saddle to securely hold the plug in position while changing valves.

The method of my device is to first close the gate valve 3, and thereafter to remove the fittings attached to the external side of the valve. The pressure vacuum chamber, carrying and supporting the tubular member 8 and the pull rod 11, is then securely attached to the gate valve. The gate valve may then be opened. The safety saddle comprising the two section collar 17, the outwardly extending links 21, and the cross member 26, carrying the power screw 29, is then securely attached to the nipple by means of the bolts 18, and the set screw 19. At this stage of the operation the cross member 22 is not attached to the safety saddle. Hand wheel 28 is then rotated against the end of the pull rod 11, to force the pull rod 11, the tubular member 8 and the expanding plug through the gate valve until the plug is positioned within the nipple 2. The nut 12 is then rotated so as to cause the expanding plug to seal the nipple. When this is done, the test cock 5 may be opened to empty the pressure chamber 4 of the fluid contained, and thereafter to test the efficacy of the sealing of the expanding plug. These operations having been completed, the gate valve 3 may be disconnected from the flange 35 by removing the bolts 54. The gate valve and pressure chamber 4 integrally are then slipped along the tubular member 8, until in a position beyond that shown for cross piece 22. Cross piece 22 is then inserted in place, rigidly supporting the tubular member 8 to securely maintain the plug in position. Thereafter the cross member 26 may be removed from the safety saddle permitting the valve and pressure chamber to be completely removed. It will be apparent that many modifications of my basic invention may be made. Similarly various engineering refinements may be incorporated. For example, it is contemplated that more rigid support of the plug may be obtained if a thrust collar is provided on the tubular means against which one of the cross links of the safety saddle may bear. Likewise, it may be desirable to add means for providing positive release of the expanding plug from the nipple aiding in the contraction of the plug and allowing withdrawal of the plug even though it has been tightly wedged in the nipple. For the purpose of disclosing my invention in the simplest operative fashion these and other refinements have not been illustrated, or specifically described. For this reason it is desired that the appended claim be given a broad interpretation commensurate to the contribution to the prior art.

Having now fully described my invention, I claim:

Apparatus for sealing a nipple carrying a valve which comprises a pressure vacuum chamber attached at one end to the outer side of the valve, an expansion seal assembly carried by the pressure vacuum chamber and including a tubular member and pull rod controlling an expandible plug, the seal assembly extending through the valve into the nipple, means for expanding the plug to close the nipple, a safety saddle to securely hold the expansion seal assembly in position while changing the valve, the safety saddle including a collar adapted to be fixed to the nipple, connecting links attached to said collar extending longitudinally outwardly parallel to said pressure chamber and beyond the pull rod, a terminal cross member disposed between the connecting links and carrying a threaded bore axially beyond and aligned with the pull rod, a power screw engaging the threaded bore and carrying a thrust bearing for engaging the pull rod for maintaining the expansion seal assembly in position, and a second cross member adapted to be disposed intermediate the collar and the terminal cross member to engage the tubular member to prevent longitudinal movement thereof whereby the terminal cross member can be released and the valve removed while maintaining the position of the expansion seal assembly.

References Cited in the file of this patent

UNITED STATES PATENTS

| Number | Name | Date |
|---|---|---|
| 571,077 | Sheridan | Nov. 10, 1896 |
| 607,492 | Thomas et al. | July 19, 1898 |
| 1,075,384 | Seidel | Oct. 14, 1913 |
| 1,226,209 | Harris | May 15, 1917 |
| 1,587,689 | Weiss et al. | June 8, 1926 |
| 1,833,700 | Wolf | Nov. 24, 1931 |
| 2,118,756 | Bergert | May 24, 1938 |
| 2,141,274 | Lenhart | Dec. 27, 1938 |
| 2,299,365 | Valuch | Oct. 20, 1942 |
| 2,485,022 | Taylor | Oct. 18, 1949 |

FOREIGN PATENTS

| Number | Country | Date |
|---|---|---|
| 2,503 | Great Britain | Sept. 29, 1865 |